US008335272B2

(12) United States Patent
Roberts

(10) Patent No.: US 8,335,272 B2
(45) Date of Patent: Dec. 18, 2012

(54) MULTIPLE ANTENNA TRANSMISSION WITH VARIABLE DIVERSITY GAIN

(75) Inventor: Keith Roberts, Crawley (GB)

(73) Assignees: Koninklijke Philips Electronics N.V., Eindhoven (NL); Sharp Corporation, Osaka (JP)

( * ) Notice: Subject to any disclaimer, the term of this patent is extended or adjusted under 35 U.S.C. 154(b) by 1021 days.

(21) Appl. No.: 12/091,584

(22) PCT Filed: Oct. 20, 2006

(86) PCT No.: PCT/IB2006/053876
§ 371 (c)(1),
(2), (4) Date: Apr. 25, 2008

(87) PCT Pub. No.: WO2007/049208
PCT Pub. Date: May 3, 2007

(65) Prior Publication Data
US 2008/0285675 A1  Nov. 20, 2008

(30) Foreign Application Priority Data

Oct. 28, 2005 (EP) .................................. 05110153
Feb. 6, 2006 (EP) .................................. 06101349

(51) Int. Cl.
*H04B 7/02* (2006.01)
(52) U.S. Cl. ........ 375/267; 375/324; 375/340; 375/343; 375/347; 375/295; 375/142; 375/143; 375/150
(58) Field of Classification Search .................. 375/324, 375/316, 340, 343, 267, 295, 347, 142, 143, 375/150
See application file for complete search history.

(56) References Cited

U.S. PATENT DOCUMENTS

| 4,131,762 | A  | * | 12/1978 | Reid .............................. 370/370 |
| 6,456,647 | B1 | * | 9/2002 | Banister ........................ 375/142 |
| 7,095,709 | B2 | * | 8/2006 | Walton et al. ................. 370/208 |
| 7,154,913 | B2 | * | 12/2006 | Miller-Smith ................ 370/486 |
| 7,333,465 | B2 | * | 2/2008 | Jou ................................ 370/342 |
| 7,634,030 | B2 | * | 12/2009 | Kim et al. ..................... 375/341 |
| 2003/0013468 | A1 |  | 1/2003 | Khatri |
| 2003/0235147 | A1 |  | 12/2003 | Walton et al. |

(Continued)

FOREIGN PATENT DOCUMENTS

| WO | 0145300 A1 | 6/2001 |
| WO | 2005004351 A1 | 1/2005 |

OTHER PUBLICATIONS

Texas Instruments: Double-STTD Scheme for HSDPA Systems with four Transmit Antennas: Link Level Simulation Results, AH24: HSDPA, Discussion Approval, TSG-RAN Working Group 1 Meeting #20, May 21-25, 2001, TSGR1# (01)0458, Busan Korea. pp. 1-16.

(Continued)

*Primary Examiner* — David Ometz
*Assistant Examiner* — Rahel Guarino

(57) ABSTRACT

A MIMO transmitter has a modulator (40,41,42, 120, 122) a demultiplexer 100 arranged to divide the information into one or more demux streams for transmission over different ones of the channels, and a diversity splitter (110) to derive one or more sub-streams of the same information. A decorrelator (120) such as a scrambler (150, 155) decorrelates the substreams before or after the modulation. The arrangement is configurable to vary in use a ratio of demultiplexing and of diversity splitting. This balances between the gains from diversity and spatial multiplexing, without needing major changes to the transmit and receive processing.

14 Claims, 8 Drawing Sheets

U.S. PATENT DOCUMENTS

| | | |
|---|---|---|
| 2004/0196919 A1 | 10/2004 | Mehta et al. |
| 2004/0266484 A1 | 12/2004 | Kogiantis et al. |
| 2005/0002467 A1 | 1/2005 | Seo et al. |
| 2005/0084000 A1 | 4/2005 | Krauss et al. |
| 2005/0111376 A1 | 5/2005 | Raghothaman et al. |

OTHER PUBLICATIONS

Angeliki Alexiou, et al: Assessment of Advanced Beamforming and MIMO Technologies, IST-2003-507581 Winner, D2.7, Ver 1.1, Feb. 28, 2005, pp. 1-190.

Foschini, G.J.: "D-BLAST Layered Space-Time Architecture for Wireless Communication in a Fading Environment When Using Multi-Antennas"; Bell Labs Technical Journal, pp. 41-59, Autumn 1996.

Ericsson: Selective Per-Antenna Rate Control (S-PARC), 3 GPP TSG RAN WGI #36, RI-04-0307, Malaga, Spain, Feb. 16-20, 2004.

\* cited by examiner

MULTIPLE ANTENNA TRANSMISSION WITH VARIABLE DIVERSITY GAIN

FIELD OF THE INVENTION

This invention relates to a transmitter, a receiver, a baseband processor, a method of transmitting, a method of receiving, and a program for carrying out parts of the method.

BACKGROUND OF THE INVENTION

It is known to provide multiple antenna wireless communication systems which exploit multiple spatial channels in the transmission medium between the transmitter and the receiver, to simultaneously transmit multiple different information streams, or to simultaneously transmit multiple copies of the same information redundantly. In the first case the capacity is increased, and in the second case the quality or robustness can be increased. Such multiple antenna wireless communication systems are known as MIMO (multiple input multiple output) systems, where there are multiple antennas at both ends. They are known as MISO (multiple input single output) where there is only a single antenna at the receiver. The multiple data streams can be referred to as MIMO channels or spatial channels, to distinguish from frequency or coding channels. Thus where different information is sent on different spatial channels, this is referred to as spatial multiplexing, and where the same information is sent, this is referred to as spatial diversity or transmit diversity.

The transmitted data streams may experience different channel conditions (e.g. different fading and multipath effects) and so have different signal to noise ratios (SNRs). Since the channel conditions typically vary with time, the data rate supported by each channel may vary with time. If the characteristics of each MIMO channel (e.g. SNRs for the data streams) are known at the transmitter, then the transmitter may be able to determine a particular data rate and coding and modulation scheme for each data stream adaptively with closed loop control to a given packet error rate. However, for some MIMO systems, this information is not available at the transmitter, so these are open loop systems.

Per-Antenna Rate Control (PARC) is a multiple path, multiple-antenna MIMO technique that has been proposed within the well known 3rd Generation Partnership Project (3GPP). Within 3GPP, PARC is applied to code division multiple access (CDMA) systems but the method is also applicable to systems without spreading or employing other transmission techniques, including orthogonal frequency division multiplexing (OFDM). FIGS. 1 and 2 show a transmitter and receiver respectively to show how the PARC scheme operates.

As shown in FIG. 1, the bit-stream to be transmitted is split by a demultiplexer 10 into a number of streams each carrying different information, each of which has (potentially different) modulation and coding applied as well as interleaving. Each stream has forward error correction 20, 21, 22, interleaving and coding 30, 31, 32, and modulation 40, 41, 42. The streams are then transmitted via separate antennas 50, 51, 52.

At the receiver (see FIG. 2) a number of antennas equal to or greater than the number of transmit-antennas is typically used. The signal at each receive-antenna 11, 12, 13 is a combination of the signals transmitted from each transmit-antenna 50, 51, 52. The receiver can apply an algorithm such as Minimum Mean Square Error (MMSE) estimation shown by item 15, or MMSE plus Successive Interference Cancellation (SIC) in order to estimate the symbols of each transmit stream. The receiver may also provide feedback to the transmitter of measurements of the channel quality, for example a signal to noise plus interference ratio (SNIR) measurement for each transmitted stream. The transmitter may use this information in making decisions to adapt the appropriate modulation and coding for each stream. Following the MMSE, the receiver processes the streams from each antenna to reverse the processing in the transmitter, so demodulation 25, 26, 27 is followed by deinterleaving 35, 36, 37, followed by a viterbi type decoding 45, 46, 47, and remultiplexing (merging) of the streams 55.

PARC can achieve spatial multiplexing gains, i.e. the simultaneous transmission of multiple data streams using the same time and frequency resources but different 'spatial' resources (i.e. multiple transmit antennas). These simultaneous transmissions might be destined for a single receiving unit, or to different receiving units. In the latter case this is referred to as Spatial Division Multiple Access (SDMA). PARC may be considered as a refinement of the original BLAST family of spatial multiplexing techniques that includes rate adaptation of the spatially multiplexed sub-streams.

Spatial multiplexing schemes aim to maximise the data throughput and achieve as near as possible the available capacity of the wireless channel.

An alternative strategy is spatial diversity, also called transmit diversity, as mentioned above. Although the gains from both spatial multiplexing and transmit diversity are maximal in a full rank channel, such diversity gains are less sensitive to the magnitude of the individual singular values than spatial multiplexing gains and are achievable in a wider set of practical channel scenarios. "Full rank" is defined as follows. For a single carrier, or a single subcarrier in an OFDM or other multi-carrier system, a flat-fading channel may be expressed as an MR×MT matrix, relating the signals at the MR receive antennas to the symbols from the MT transmit antennas. The non-zero singular values of the channel matrix give a measure of the number and quality of the spatial sub-channels that are available for spatial multiplexing. The maximum number of non-zero singular values is min(MR,MT) and in this case the channel is "full rank".

Briefly, spatial diversity consists of transmitting the same data stream via multiple antennas and/or receiving this data stream via multiple receive-antennas. This provides the receiver with multiple copies of the wanted data stream, with each copy usually experiencing different channel conditions. The receiver can combine the different sub-streams in an optimal way in order to provide the best estimate of the transmitted data stream.

Typically, diversity schemes utilise space-time coding of the data stream in order to produce streams for each transmit antenna. The, to some extent conflicting, aims of space-time coding are to achieve full diversity for improved communication performance, plus orthogonality for low complexity decoding, whilst retaining the information rate as high as possible.

Currently proposed MIMO systems typically provide either spatial multiplexing or spatial diversity, and are therefore only optimal in a certain subset of scenarios, i.e. in a certain subset of the full set of wireless channels that might be experienced. Current proposals to simultaneously achieve both gains suggest space-time codes that offer a predetermined degree of both diversity and spatial multiplexing [see Texas Instruments, "Double-STTD scheme for HSDPA systems with four transmit antennas: Link level simulation results", TSG-R WG1 document, TSGR1#20(01)0458, $21^{st}$-$24^{th}$ May, 2001, Busan, Korea], and also a 'switched' scheme that effectively implements both diversity and spatial multiplexing schemes in both the transmitter and receiver and switch between these according to some criterion [see IST-2003-507581 WINNER, "Assessment of Advanced Beamforming and MIMO Technologies", D2.7, February 2005].

Another system known from US patent application 2003/0013468 shows using a scramble code to reduce the autocorrelation between time delayed versions of the same data stream. The scrambling will be the same for each of the streams transmitted from a particular transmitter.

SUMMARY OF THE INVENTION

It is an object of the invention to provide improved apparatus or methods.

According to a first aspect of the invention, there is provided a transmitter for transmitting information using multiple wireless channels, having a demultiplexer arranged to derive two or more demux streams carrying different parts of the information, and a diversity splitter arranged to derive duplicate sub-streams from the information, or from one or more of the demux streams, for transmission over the channels, at least one of the demultiplexer and the diversity splitter being variable so that a ratio of demultiplexing and of diversity splitting can be varied in use.

This enables the transmissions to be matched better to changing conditions by flexibly adjusting the balance between the gains from diversity and demultiplexing, without necessarily making major changes to the transmit and receive processing.

An additional feature of some embodiments is a decorrelator arranged to decorrelate the duplicate sub-streams of the same information, before or after modulation, for transmission over different ones of the channels. This is particularly useful to enable the diversity to be added to known schemes for implementing spatial multiplexing with little alteration.

Another such additional feature is the decorrelator having any one or more of: a scrambler arranged to scramble the sub-streams differently, an interleaver arranged to interleave the sub-streams differently, and a coder arranged to code the sub-streams differently.

An additional feature of some embodiments is a coder for coding the duplicate sub-streams, the decorrelator having the interleaver arranged to interleave the duplicate sub-streams differently to provide the decorrelation, the interleave differences not being dependent on coding differences.

Other additional features include the decorrelator having a scrambler arranged to scramble the different sub-streams differently, the scrambler being arranged to operate on any one or more of: uncoded bits before a coder, encoded bits output by a coder, and symbols output by a modulator.

The diversity splitter and the decorrelator can be arranged to derive uncorrelated sub-streams of one or more of the demux streams after the demultiplexing. The variation of one or more of the diversity splitter and the demultiplexer can be responsive to feedback indicating conditions of one or more of the channels. The demultiplexer and the diversity splitter can be part of a baseband processor.

Another aspect of the invention provides a receiver for receiving signals, the signals having multiple demux streams and duplicate sub-streams, a ratio of the demux streams to the sub-streams being variable in use, the receiver having a combiner arranged to recombine the duplicate sub-streams and arranged to remultiplex the demux streams in the received signals, according to the variable ratio.

Additional features for this aspect can include the receiver having a recorrelating arrangement for recorrelating the decorrelated sub-streams before they are recombined. The recorrelating arrangement can have any one or more of: a descrambler corresponding to the scrambler at the transmitter, a de-interleaver corresponding to the interleaver at the transmitter, and a decoder corresponding to the coder at the transmitter.

Other aspects provide a corresponding method of transmitting information over a wireless communication link using multiple spatial wireless channels, the method having the steps of creating demux streams carrying different parts of the information, splitting the information or one or more of the demux streams to create two or more duplicate sub-streams, varying a ratio of the demultiplexing and the diversity splitting of the information, and transmitting the duplicate sub-streams and the demux streams.

Another aspect provides a corresponding method of receiving information over a wireless communication link using multiple spatial wireless channels, the method having the steps of receiving signals over the multiple wireless channels at a receiver, the signals having demux streams and duplicate sub-streams, remultiplexing the demux streams in the received signals, and recombining the duplicate sub-streams, according to the variable ratio.

A corresponding program on a machine readable medium is arranged for carrying out a method of creating demux streams carrying different parts of information, splitting the information or one or more of the demux streams to create one or more duplicate sub-streams carrying the same information, and varying a ratio of demultiplexing and of diversity splitting.

A baseband processor for the transmitter has a demultiplexer arranged to derive demux streams carrying different parts of information to be transmitted, a diversity splitter arranged to derive duplicate sub-streams from the information or from one or more of the demux streams, and a controller arranged to vary a ratio of demultiplexing and of diversity splitting of the information.

Another aspect provides a transmitter for transmitting information using multiple spatial wireless channels, having a demultiplexer arranged to derive two or more demux streams carrying different parts of the information, a diversity splitter arranged to derive duplicate sub-streams from the information or from one or more of the sub-streams, for transmission over the channels, a decorrelator arranged to decorrelate the duplicate sub-streams, and a coder for coding the duplicate sub-streams, the decorrelator having an interleaver arranged to interleave the duplicate sub-streams differently to provide the decorrelation, the interleave differences not being dependent on coding differences.

Another aspect provides a transmitter for transmitting information using a plurality spatial wireless channels, comprising a diversity splitter arranged to derive duplicate sub-streams from the information, a decorrelation means arranged to decorrelate the duplicate sub-streams, and modulation means for modulating the decorrelated duplicate sub-streams for transmission via respective antennas.

Another aspect provides a receiver for receiving signals, the signals having a plurality of duplicate sub-streams which have been decorrelated prior to transmission, the receiver comprising a recorrelating arrangement for recorrelating the decorrelated sub-streams and a combiner arranged to recombine the recorrelated sub-streams.

Additional features and advantages will be described below.

Any of the additional features can be combined together or with any of the aspects of the invention, as would be apparent to those skilled in the art. Other advantages may be apparent to those skilled in the art, especially over other prior art not known to the inventors.

BRIEF DESCRIPTION OF THE DRAWINGS

Embodiments of the invention will now be described by way of example only, and with reference to the accompanying drawings, in which.

DETAILED DESCRIPTION

Figure 1:
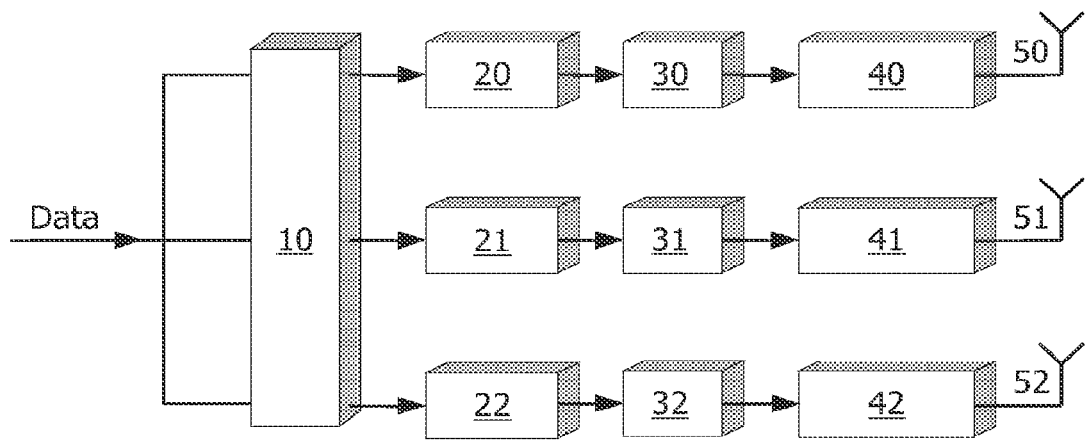
FIGS. 1 and 2 show schematic views of a transmitter and a receiver respectively according to a known PARC type arrangement.
Figure 2:
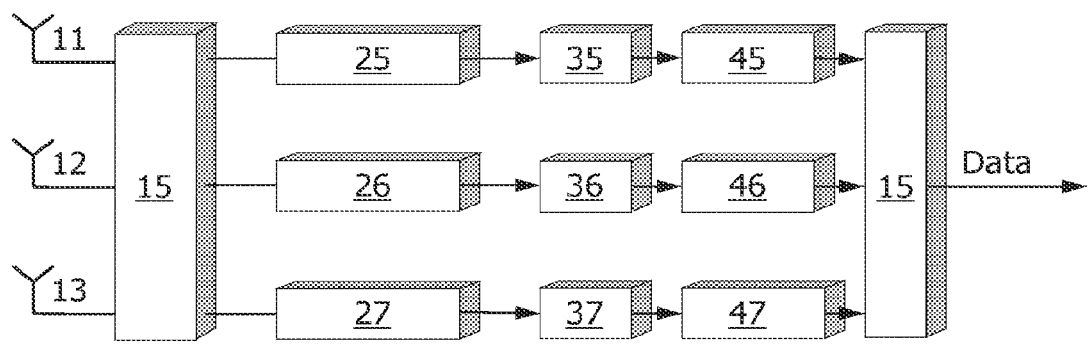

Some of the embodiments provide a MIMO spatial multiplexing wireless scheme in which different data is transmitted from each of a plurality of antennas at the same time and frequency and is adapted to enable also the same data to be transmitted from more than one antenna and, at the receiving equipment, is adapted to enable the same data received via different antennas to be combined diversity-style to produce an output data stream. Prior to transmission, decorrelation, such as scrambling, is applied to ensure that the same data transmitted from different antennas has uncorrelated bit values; this enables the MIMO receiver processing to operate substantially identically as for spatial multiplexing, and then de-scrambling is applied to recover the data. By uncorrelated, it is meant that the same data transmitted simultaneously from different antennas has bit values the majority of which are different for the different antennas.

The proportion of transmission capacity used for transmitting the same data can be adapted in some embodiments, thereby providing a flexible balance between increased capacity, when transmitting different data, and more robust transmission, when transmitting the same data. Thus the benefits of spatial multiplexing and diversity can be combined in a more flexible way. Such MIMO systems can be capable of providing both spatial diversity and spatial multiplexing gains and flexibly adapt between these as appropriate for the current channel conditions. They can achieve spatial diversity in wireless communication schemes which were designed to provide spatial multiplexing gains. This is achieved in some embodiments by producing decorrelated sub-streams of a data stream.

The decorrelation step is important as some algorithms, such as MMSE, typically employed at the receiver can exploit this to separate and estimate the transmitted symbols of each sub-stream due to the fact that the sub-stream signals are uncorrelated. Directly transmitting the same data stream from each antenna in an attempt to achieve diversity could produce highly correlated streams.

The embodiments are based on a recognition that although spatial multiplexing can provide throughput gains, these gains are not achievable in all conditions of wireless channels. The largest spatial multiplexing gains are available in "full rank" channels, typically characterised by a wide angular spread of the signals at both transmitter and receiver, and/or wide separation of the transmitter antenna elements and of the receiver antenna elements. This can also be described as having low transmit-correlation and low receive-correlation.

In many practical scenarios of interest the channel is less than full rank and the throughput gain achievable by spatial multiplexing as compared to a single antenna (SISO) solution may be small. This can occur, for example, with a transmitter sited high up, with a good line of sight to the receiver, and few reflecting or scattering objects in the vicinity. This leads to a high transmit-correlation and narrow angular spread at the transmitter.

Further, even when the channel is full rank, the available spatial multiplexing gain is highly dependent upon the individual singular values of the channel, with the maximal spatial multiplexing gains being achievable only in channels with a small spread of singular values. In summary, spatial multiplexing may often not be the best choice of scheme for utilising multiple transmit-antennas.

The embodiments are also based on a recognition of some drawbacks of the other attempts to combine multiplexing and diversity. A drawback of space-time codes that offer a degree of both diversity and spatial multiplexing [see Texas Instruments, "Double-STTD scheme for HSDPA systems with four transmit antennas: Link level simulation results", TSG-R WG1 document, TSGR1#20(01)0458, $21^{st}$-$24^{th}$ May, 2001, Busan, Korea,], is that the split between diversity and spatial multiplexing gains is usually fixed by the code definition, and to change the balance requires changing the code with consequent changes to transmitter coding and receiver decoding algorithms. A drawback of 'switched' schemes that effectively implement both diversity and spatial multiplexing schemes in both the transmitter and receiver and switch between these according to some criterion [see IST-2003-507581 WINNER, "Assessment of Advanced Beamforming and MIMO Technologies", D2.7, February 2005], is that it requires two sets of baseband transmitter and receiver processing to be implemented at each end of the communications link.

Figure 3:
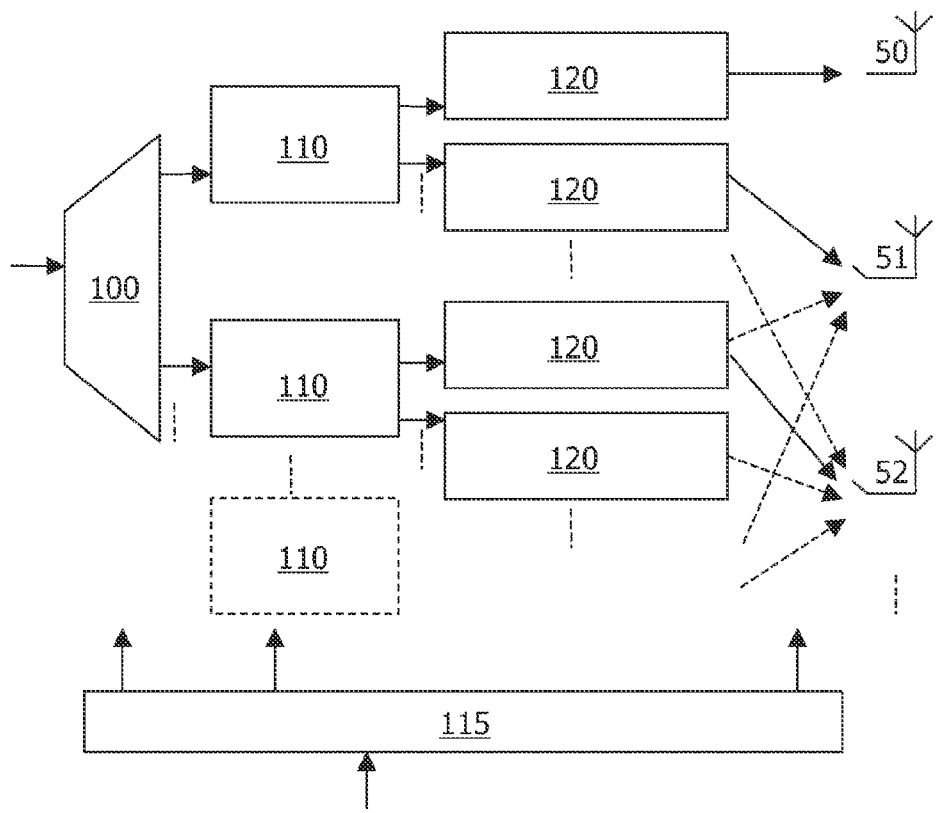
FIGS. 3 to 7 show schematic views of transmitters according to embodiments of the invention.

FIG. 3 shows a transmitter according to an embodiment. A variable demultiplexer 100 is able to divide the data stream into a number of parts, here called demux streams, the number being controllable according to the conditions. This can be implemented in software for execution by a conventional processor of any type, or it can be implemented in hardware such as digital logic circuits implemented in an ASIC or FPGA or similar technology as would be apparent to those skilled in the art. At least some of the demux streams are fed to variable splitters 110 which create copies of the demux streams, here called sub-streams. The splitters are variable in the sense that the number of copies can be varied. The number of sub-streams or demux streams fed to the next stage will usually correspond to the number of antennas in use, which number optionally can be varied according to the conditions. By varying the number of demux streams and the number of sub-streams created, the ratio of spatial multiplexing gain to spatial diversity gain can be varied dynamically according to the conditions. This can include all demux with no splitting, and all splitting with no demux.

Each of the sub-streams, and any demux streams that have not been split, are then fed to a decorrelation and modulation part 120. Again this is typically implemented in software. This part can be implemented in many ways, and some examples will be explained below. Notably the demultiplexer and decorrelation and modulation parts can have adaptable rates following known practice, so that noisy channels are fed less data than less noisy channels for example. This can be controlled by feedback of channel state information. The decorrelation is useful to enable the diversity gain to be realised. The modulation enables transmission by wireless paths. There can be other processing parts in the chain, such as coding and so on, depending on the application.

The outputs of these parts are fed to the antennas 50, 51, 52. As illustrated schematically by dotted lines, these outputs may be switched to different antennas if ratio of split to demux is changed. A number of configurations will be described below with reference to FIGS. 4, 5 and 6. The configuration is controlled by a demux and split ratio controller 115, typically implemented in software, which can use various parameters to decide on an optimum ratio. These can include channel states fed back from a receiver, channel states calculated from signals arriving from a receiver, for example by utilising reciprocity in a Time Division Duplex (TDD) system, channel state of a pilot channel, overall error rates over many channels, antenna correlation figures, information from neighbouring channels, or other external information such as antenna orientation, desired data rate, and desired quality. Indeed anything which may help determine whether diversity gain or spatial multiplexing gain is preferred. The variable diversity gain can in some embodiments be combined with established practice on configurable beam forming.

Figure 4:
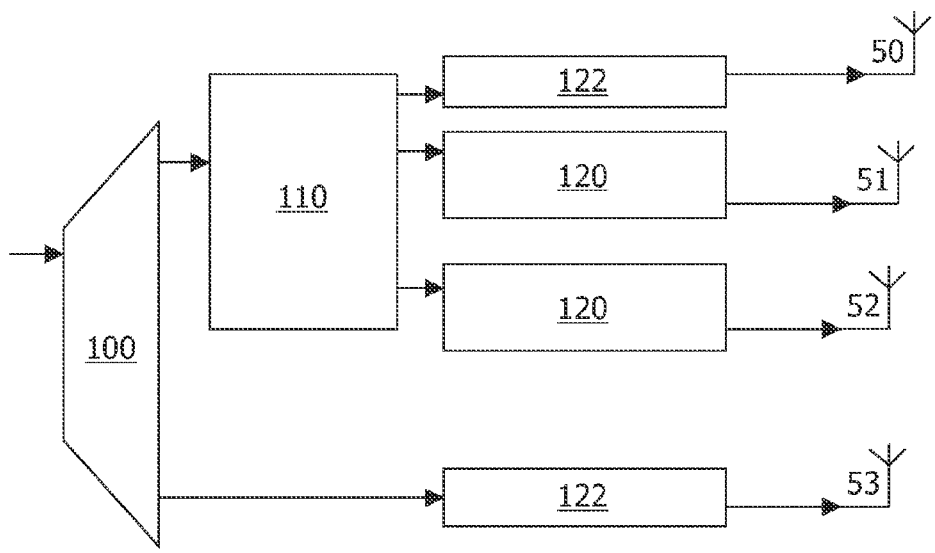
Figure 5:
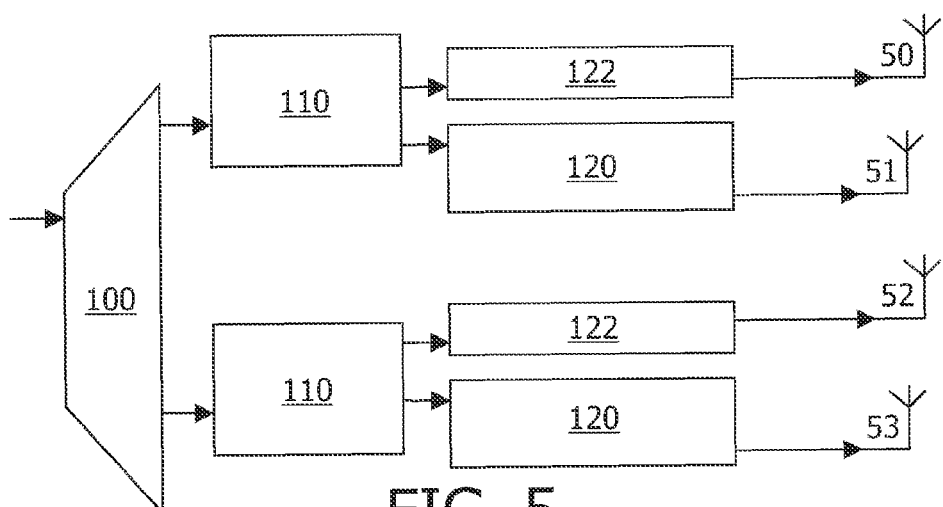
Figure 6:
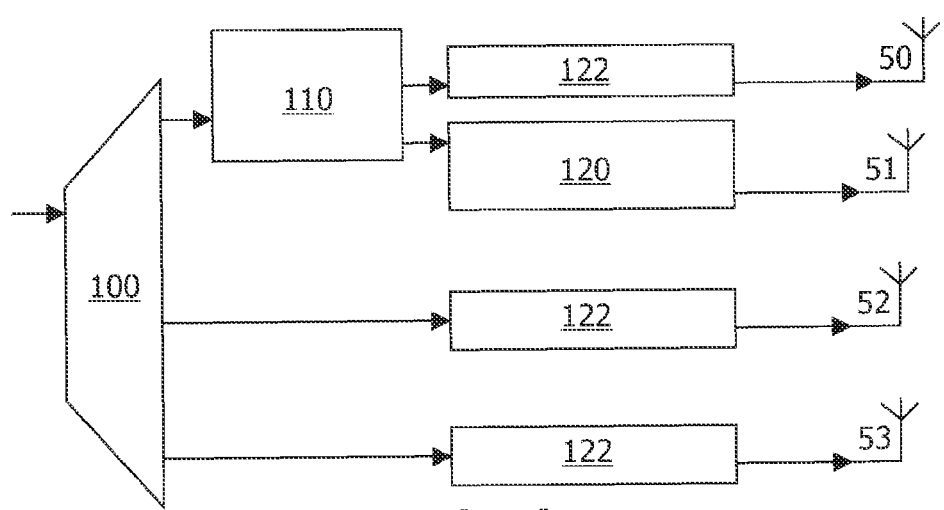

FIGS. 4, 5 and 6 show configurations suitable for use with 4 antennas, each figure showing a different ratio of demux to split. In FIG. 4, a first demux stream is split into three sub-streams. A second demux stream is not split. Of the three sub-streams, the first is modulated by modulator 122, and any other processing such as coding is carried out as desired, before the stream is transmitted by antenna 50. There is no decorrelation in this case since decorrelation is a relative operation, so the second and third sub-streams are decorrelated relative to the first.

In FIG. 5, the system is configured to have two demux streams as before, and in this case both are split into two sub-streams to derive the four streams for the four antennas. This evens out the amount of demux and the amount of splitting. In FIG. 6, there is more demux, there are three demux streams, and only one is split into two sub-streams. The second of the sub-streams is decorrelated relative to the first. Other configurations can include varying FIG. 5 or 6 to alter which antennas are fed by the split sub-streams and which are fed by the unsplit demux streams. Other configurations can include all splitting with no demux, or all demux with no splitting. As the number of antennas is increased, the number of possible configurations will increase also. As the configuration is changed, the receiver in most cases will need to be alerted so that the corresponding re-multiplexer can configured to merge streams that are demux streams, or combine sub-streams that are copies.

Figure 7:
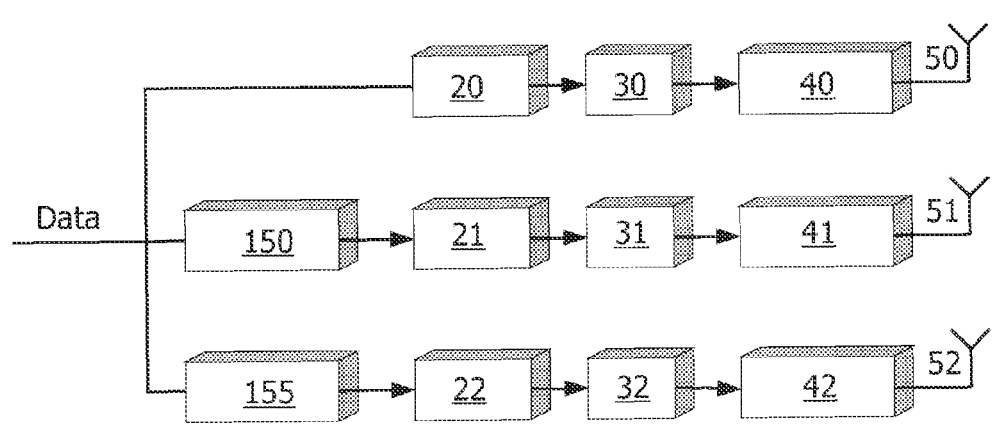
Figure 8:
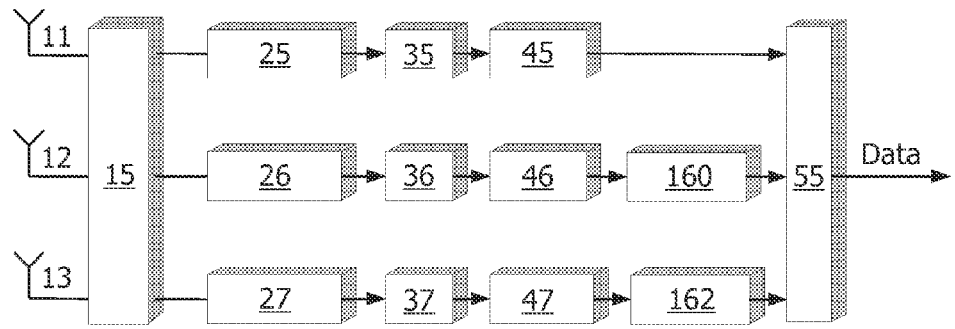
FIG. 8 shows a schematic view of a receiver according to an embodiment.

FIGS. 7 and 8 show an example of a transmitter and a corresponding receiver. In this example, scrambling is used as a relatively simple method of producing multiple uncorrelated sub-streams of the same data stream. A common bit scrambling technique is to XOR (exclusive—or) the bit-steam to be scrambled with a pseudo-random bit-stream known to both transmitter and receiver. A known symbol scrambling technique is to multiply the complex baseband symbols with a complex pseudo-random symbol stream. Scrambling techniques are well known in the communications field, for example for distinguishing between Base-Station transmissions of different cells in UMTS (Universal Mobile Telecommunication System), and for breaking up long runs of 1s or 0s in the transmitted bit-stream to avoid receiver DC-drift. The application of scrambling techniques to achieve decorrelation to transform a spatial-multiplexing system into a diversity scheme is believed to be novel.

As shown in FIG. 7, a data stream which may be a demux stream is split into sub-streams. A first stream is not scrambled but is fed through a forward error correction (FEC) stage 20, an interleaver 30, and a modulation stage 40, which may also include coding or mapping. The FEC and coding and interleaving need not be the same in each of the sub-streams, but can be adaptable to match better the channel characteristics for each channel. A second of the sub-streams is fed through a first scrambler 150 then through stages of FEC and any other coding 21, interleaving 31 and modulation 41. A third of the sub-streams is fed through a second scrambler 155 then through stages of FEC 22, interleaving 32 and modulation 42. Each sub-stream is then transmitted by their respective antenna 50, 51, 52.

The transmitter employs channel quality information obtained, for example, by feedback from the receiving end or from channel reciprocity measurements. The channel quality information may be, for example, a signal-to-interference-plus-noise ratio (SINR) for each transmission channel or antenna in a PARC method, or singular values or eigen values or vectors in a PSRC (per stream rate control) type or other beamforming or preceding method. The coding can be adapted so that a higher order modulation method, for example 16-QAM or 64-QAM, is used when "good" channel quality information has been received and a lower order modulation method, for example BPSK or QPSK, may be used when "bad" channel quality feedback is received.

The demultiplexer 100 demultiplexes a data stream from a data source. Control software decides how many parts the data stream will be divided into. The number of bits allocated to each of the parts may be adapted based on channel conditions.

The sub-streams undergo coding and interleaving to be mapped to symbols. In some embodiments the coding can involve spreading codes which operate in the time domain following established techniques and can help cancel post-decoding interference or enable Code Division Multiple Access (CDMA). If spreading codes are used, then codes such as Orthogonal Variable Spreading Factor (OVSF) codes can be used to spread the data blocks for example.

As an example, if a data stream input to the demultiplexer 100 includes 600 bits, then the demultiplexer 100 might, for example, segment the input data stream into two data blocks of 300 bits each, which are then processed by the FEC stages 20, 21, 22, interleavers 30, 31, 32, and modulation (mapping) stages 40, 41, 42. In more detail, each of the 300 bits is coded based on the coding scheme for that particular stream, for example a turbo code of rate ½ may be used for the first block and a turbo code of rate ⅓ used for the remainder. Thus, is in this example, the first 300 bits would be coded into 600 bits (i.e., a turbo code rate of ½) and the next 300 bits would be coded into 900 bits (i.e. a turbo code rate of ⅓). The two coded blocks of data are then passed to the interleavers 30, 31, 32 for mapping. If 16-Quadrature Amplitude Modulation (16-QAM) is used for the first block and Quadrature Phase Shift Keying (QPSK) is used for the next block, then the first 600 coded bits will be mapped into 150 symbols, since 16-QAM maps 4 bits to 1 symbol. The next block of 900 bits will be mapped into 450 symbols, since QPSK maps 2 bits into 1 symbol.

FIG. 8 shows a corresponding receiver for the case of a transmitter that employs only diversity splitting with no demux. The signal at each receive-antenna 11, 12, 13 is a combination of the signals transmitted from each transmit-antenna 50, 51, 52. The receiver can apply an algorithm such as Minimum Mean Square Error (MMSE) estimation shown by item 15, or MMSE plus Successive Interference Cancellation (SIC) in order to estimate the symbols of each transmit stream. The receiver processes the streams from each antenna following the MMSE, to reverse the processing in the transmitter. Outputs of the MMSE estimator are demodulated, deinterleaved, and decoded, including despreading if spreading was used in the transmitter. The reconstructed diversity sub-streams are then combined using, for example, maximum ratio or equal gain combining, and the reconstructed demux streams remultiplexed, i.e. merged. So in FIG. 8, demodulation parts 25, 26, 27 are followed by deinterleaving parts 35, 36, 37, then a Viterbi type decoding part 45, 46, 47, is followed by descrambling of the second and third sub-streams by parts 160 and 162 and recombining of the streams by a combiner 55. Where the transmitter additionally employs demultiplexing into demux streams the combiner 55 in the receiver is arranged to apply a further step of remultiplexing of the recovered demux streams. In cases where the transmitter can vary the ratio of demux and duplicate sub-streams, the combiner is arranged to adapt accordingly to combine the duplicate sub-streams and remultiplex the demux streams according to the ratio. The combiner can receive a control signal from the transmitter to indicate which streams are duplicate sub-streams and which are demux sub-streams.

The example embodiment of FIGS. 7 and 8 is a modified PARC type arrangement with the modifications required to achieve diversity instead of spatial multiplexing. It can be seen that the minor additional processing introduced is:

Transmitter: Scrambling of sub-streams to be transmitted via multiple antennas for diversity purposes Receiver: Descrambling of sub-streams and combining Note that by changing the routing of data streams it is possible to flexibly provide differing balances between spatial multiplexing and diversity gains. For example, for a system with four transmit antennas, two different data streams could be spatially multiplexed with both of these streams being transmitted from two antennas each in order to achieve diversity. Alternatively, one data stream could be transmitted via three antennas for diversity and a second data stream spatially multiplexed via the fourth antenna. Further still, three data streams could be spatially multiplexed with one of them being transmitted via two antennas for diversity purposes. Hence the scheme can offer a flexible balance between spatial multiplexing and diversity gains with negligible alteration to the transmit and receive processing.

Decisions concerning how many data streams to spatially multiplex and on which streams to apply diversity may be made according to channel knowledge signalled back to the transmitter. This information may be acquired either by feedback or estimated directly, for example in Time Division Duplex (TDD) systems by utilising channel reciprocity. The proposed scheme may additionally be combined with antenna selection techniques; for more details see Ericsson, "Selective Per Antenna Rate Control (S-PARC)," 3GPP TSG RAN WG1, R1-04-0307], or rotation of antenna choice as in D-BLAST [see for example G. J. Foschini, "Layered Space-Time Architecture for Wireless Communication in a Fading Environment when using Multi-Element Antennas" Bell Labs Tech. J., pp. 41-59, Autumn 1996.

Although the description given has been in terms of PARC, where a single demux stream or diversity sub-stream is routed to a single antenna, the same principles could be applied to other spatial multiplexing schemes, including those possessing greater channel knowledge at the transmitter and/or applying beamforming or pre-coding mappings that route a demux stream or diversity sub-stream to more than one antenna with potentially different weightings and thereby provide directivity. Furthermore, the decoding is identical to that of pure spatial multiplexing and hence only requires one receiver algorithm to be implemented in a system offering both spatial multiplexing and spatial diversity.

FIGS. 9 to 15 illustrate alternative embodiments for producing decorrelated sub-streams of a data stream and spatially multiplexing these decorrelated signals in a PARC-like scheme. Three methods for achieving the decorrelation are described:

1) Different scrambling of each sub-stream
2) Different interleaving pattern in each sub-stream
3) Different code polynomial applied to each sub-stream FIGS. 7 to 13 relate to type 1) and show scrambling at different stages. As previously described, scrambling is a simple manner of introducing decorrelation. However, scrambling may be applied at three points in the transmit/receive chain:

A) Bit scrambling prior to encoding
B) Bit scrambling after encoding
C) Symbol scrambling A common bit scrambling technique is to XOR the bit-steam to be scrambled with a pseudo-random bit-stream known to both transmitter and receiver. A known symbol scrambling technique is to multiply the complex baseband symbols with a complex pseudo-random symbol stream, similarly to the scrambling applied to distinguish between transmissions from base-stations of different cells in UMTS. Alternative bit and symbol scrambling methods may also be equally appropriate for this application. The three alternative positions of the scrambling are illustrated and their relative advantages/disadvantages elaborated in the following.

A) Bit scrambling prior to encoding as shown in FIGS. 7 and 8 and described above involves applying different scrambling in each sub-stream to data which is identical prior to FEC. At the receiver, for the case of bit-scrambling prior to coding, a simple but low performance combining method of the decoded descrambled sub-streams for an odd number of sub-streams is majority counting. For improved performance the combining should take into account channel quality information for each sub-stream and/or soft-information for the descrambled data bits.

An advantage of type A) is that with only a simple modification to the original PARC structure, diversity gains can be achieved in place of, or in addition to, spatial multiplexing. A disadvantage of type A) for the diversity case, is that better performance can be achieved through joint decoding, which requires alternative B or C for placement of the scrambling and descrambling functions.

Figure 9:
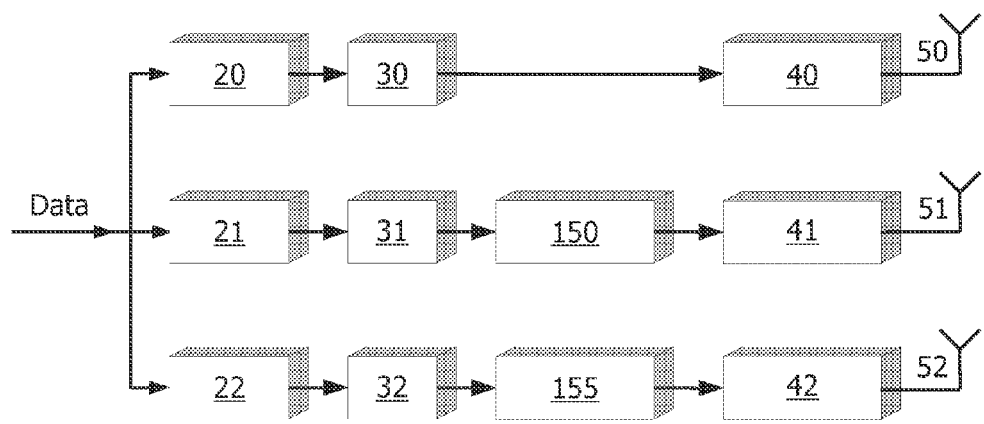
FIGS. 9 and 10 show a transmitter and receiver according to an embodiment having scrambling after coding and interleaving.
Figure 10:
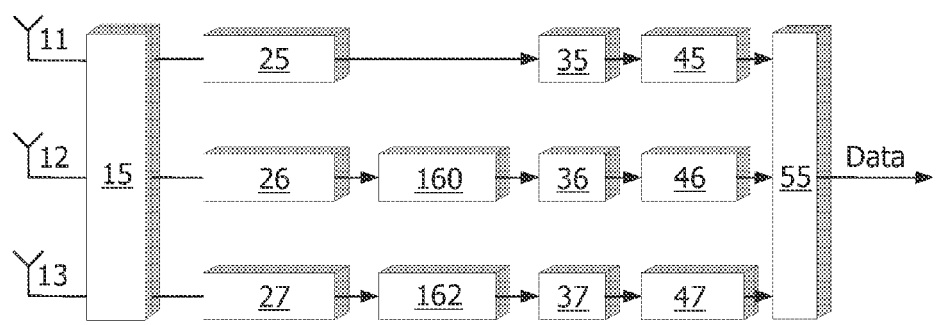

B) Bit scrambling can be carried out after coding and interleaving as shown in FIGS. 9 (transmitter) and 10 (receiver). Corresponding reference numerals have been used to those of FIGS. 7 and 8. An advantage of type B) is that with identical coding of each sub-stream, transmitter complexity can be reduced since the split into multiple sub-streams can occur after encoding. Similarly, the receiver may be simplified by combining after descrambling and employing just a single de-interleaver and viterbi decoder. Similarly, only a single interleaver is required in each of the transmitter and receiver if the same interleaver pattern is applied to each sub-stream.

Figure 11:
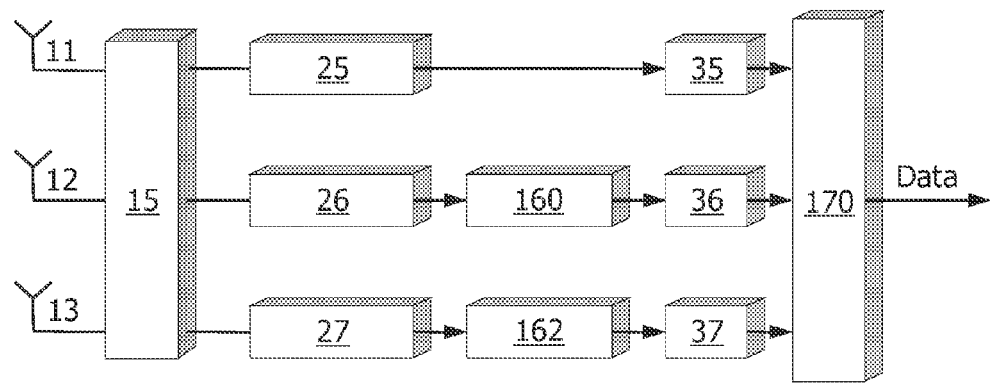
FIG. 11 shows a receiver according to an embodiment having joint decoding.

Improved performance can be achieved by employing joint decoding, which achieves a higher coding gain. With identical coding of each sub-stream, the trellis representation is also identical. Hence, the Viterbi algorithm may be employed to calculate the accumulated sum of branch metrics of all sub-streams. This joint decoding does not increase complexity yet it achieves a higher coding gain than both using separate decoders for each sub-stream and using a single decoder after combining. FIG. 11 shows such a receiver having a joint decoder 170. This also carries out the functions of the combiner, and so will also carry out remultiplexing in cases where the transmitter has sent demux streams. The order of combining duplicate sub-streams and remultiplexing demux streams should correspond to the order in the transmitter, and the order can be reversed if the order in the transmitter is reversed.

Even greater performance may be attained by using soft-input decoding, for example the Maximum A Posteriori (MAP) or Log-MAP algorithm, which requires soft-output from the demodulation, for example Log-Likelihood Ratios (LLR).

Figure 12:
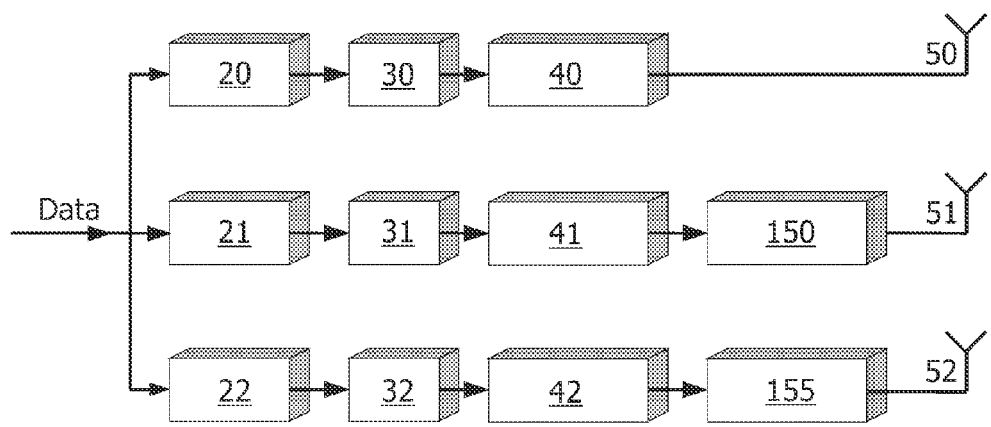
FIGS. 12 and 13 show a transmitter and receiver according to an embodiment having scrambling after modulation.
Figure 13:
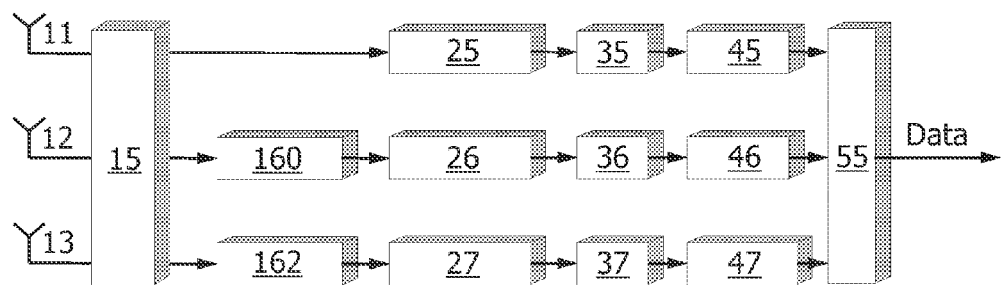

C) Symbol scrambling can be carried out after modulation of the coded bits into symbols. FIG. 12 shows a transmitter for such symbol scrambling, and FIG. 13 shows a corresponding receiver for such symbol scrambling. Modified structures similar to those for bit scrambling after encoding can also be applied to the symbol scrambling case. Again, superior performance is achieved by soft-input and/or joint decoding of the sub-streams. In this case, the scrambling is after the modulation parts 41 and 42 in the transmitter. In the receiver, the descrambling parts 160 and 162 are before the demodulation.

Figure 14:
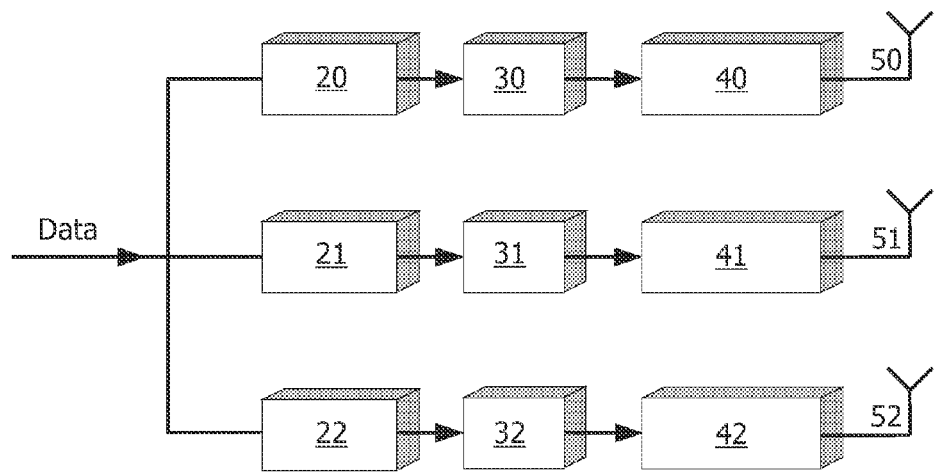
FIG. 14 shows a transmitter according to an embodiment having decorrelation by means of different interleaving and modulation for each stream.

FIG. 14 shows an example having different interleaving patterns in each sub-stream. This is in contrast to the embodiments shown in FIGS. 7 to 16 which all employed scrambling to achieve decorrelation. Of course, scrambling may be applied in addition to different interleaver patterns to help guarantee decorrelation. The complexity penalty of doing this is small due to the simplicity of the scrambling and descrambling operations. However, if scrambling is omitted it is important that different interleaving patterns are employed for each sub-stream. With different interleaving patterns for each sub-stream it remains possible to employ the soft-input and joint decoding improvements detailed above. Providing different coding for different ones of the duplicate sub-streams can be associated with different bit rates and different interleaving patterns. Nonetheless the decorrelation by different interleaving can be implemented without making the differences dependent on changes in coding. This can provide a simpler way of achieving decorrelation than other ways. Such advantages can be useful regardless of whether the ratio of demultiplexing and splitting is variable.

A third way of achieving diversity is to employ different encoding polynomials for each sub-stream to ensure decorrelated transmitted symbol streams. Again, this could be used in conjunction with scrambling. This approach however has the following disadvantages:

1) Several alternative polynomials of each desired rate are required
2) Joint decoding of the sub-streams is not possible, which reduces the potential performance These two factors make the use of different encoders a less attractive option for achieving decorrelation compared to the other embodiments described above.

From the preceding descriptions, a notable embodiment employs a combination of different interleaving patterns and different scrambling sequences in each sub-stream. The scrambling may be either:

1) bit scrambling after coding, or
2) symbol scrambling.

These approaches permit performance enhancing decoding improvements to optionally be employed. A further interesting embodiment is to precede the given scheme with an additional coding and interleaving stage in a manner similar to serially concatenated turbo codes. This permits an even higher performance iterative ('turbo') decoding to be employed.

Figure 15:
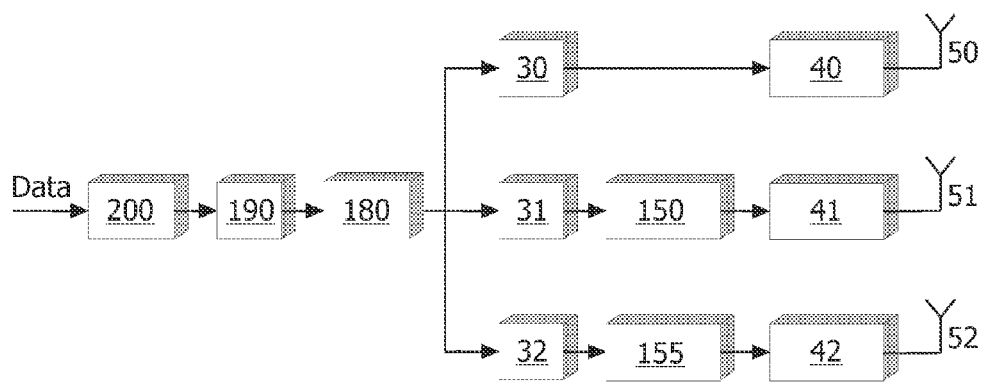
FIG. 15 shows a transmitter according to an embodiment having different interleaving and scrambling with serially concatenated coding.

FIG. 15 shows different interleaving and scrambling with serially concatenated coding. Before splitting, the data stream or demux stream is fed to a FEC stage 200, an interleaver 190, and another FEC stage 180. After splitting, the sub-streams are fed to interleavers 30, 31, 32, scramblers 150, 155, and modulation stages 40, 41, 42.

Figure 16:
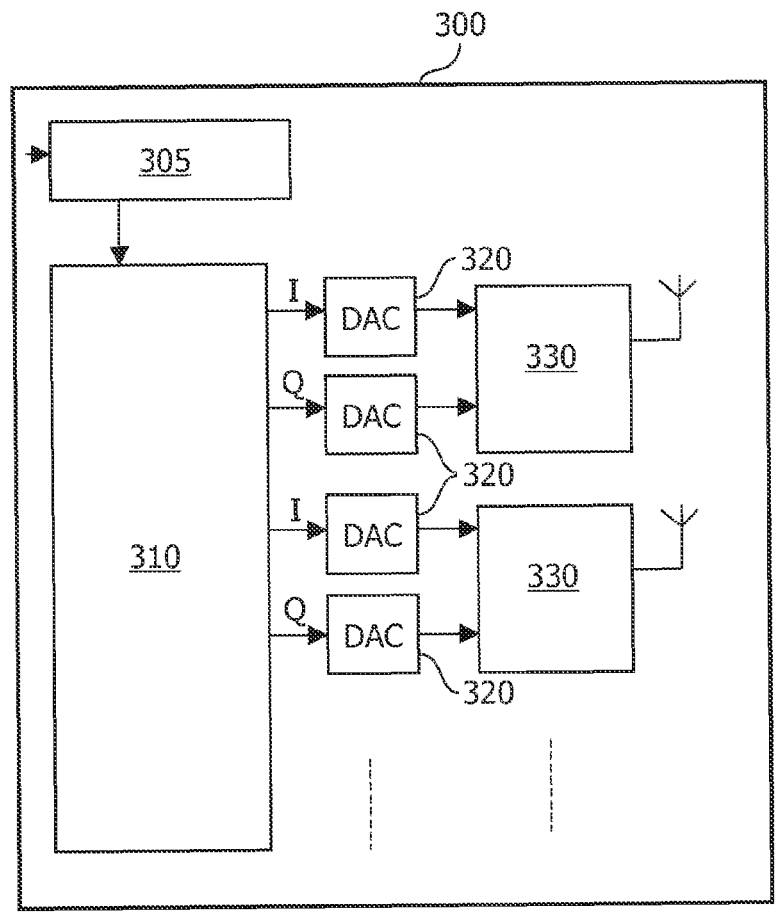
FIG. 16 shows a transmitter according to an embodiment having a digital baseband processor and software for implementing the variable diversity gain, and RF circuitry.

FIG. 16 shows an embodiment of a transmitter for a base station 300 having a network interface 305 feeding data for transmission into a digital baseband processor 310. This has software or firmware for carrying out the demultiplexing, splitting, decorrelating, modulation and other functions as set out in other figures described above. The output of the modulation function is typically digital complex baseband symbols which are output for each channel to digital-to-analogue converters (DACs) 320 for I and Q components. Analogue outputs are used to drive RF circuitry 330 such as an RF VCO, RF amplifier and gain controller, and matching circuits coupled to the antenna. All this can use conventional techniques and need not be described in more detail here. A corresponding transmitter can be located in mobile handsets since similar techniques can be used for the uplink as well as the downlink.

Figure 17:
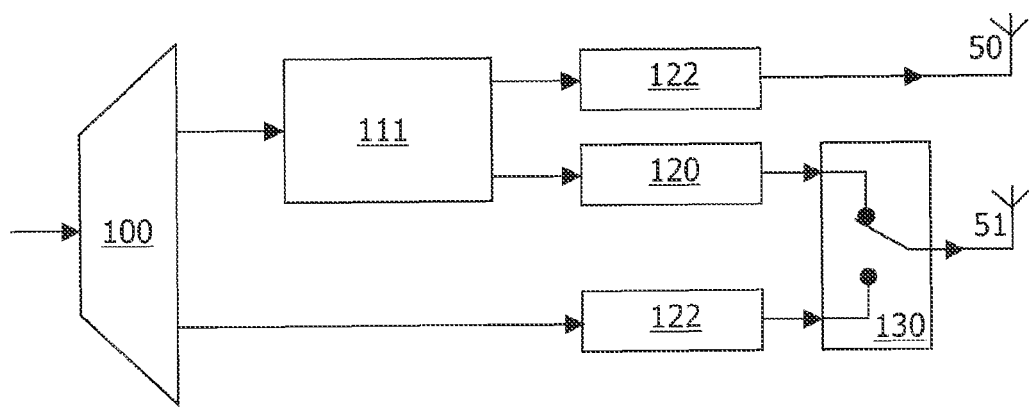
FIGS. 17 to 19 show schematic views of transmitters having two antennas.

FIG. 17 shows an embodiment employing two antennas. This embodiment has a variable demultiplexer 100 having an input for a data stream, a first output coupled to a splitter 111, and a second output coupled to an input of a modulator 122, which itself has an output coupled to a first input of a selector switch 130. The splitter 111 has a first output coupled to an input of a further modulator 122, which itself has an output coupled to a first antenna 50, and a second output coupled to an input of a decorrelation and modulation part 120, which itself has an output coupled to a second input of the selector switch 130. An output of the selector switch 130 is coupled to a second antenna 51. The selector switch 130 couples either one if its inputs to its output, under the control of a demux and split ratio controller (not illustrated in FIG. 17). The decorrelation performed by the decorrelation and modulation part 120 may be implemented in any of a variety of ways, examples of which are described herein. The modulator 122 and the decorrelation and modulation part 120 may include coding, and may include interleaving.

The embodiment shown in FIG. 17 has two modes of operation selectable under the control of the demux and split ratio controller. In the first mode the variable demultiplexer 100 is arranged to divide an input data stream into two demux streams which are delivered on its respective outputs. The demux stream delivered on the second output of the variable demultiplexer 100 is routed via the respective modulator 122 and the selector switch 130 to the second antenna 51. In the first mode the splitter 111 does not need to create a copy the demux stream delivered to it by the variable demultiplexer 100, but delivers that demux stream to the first antenna 50 via the respective modulator 122. If the splitter 111 does create a copy of the demux stream, that copy is not routed to an antenna; for example its path may be blocked by the selector switch 130.

In the second mode the variable demultiplexer 100 does not divide the input data stream into two demux streams but delivers the whole data stream to the splitter 111. The splitter 111 creates copies of the data stream, i.e. sub-streams, and one sub-stream is routed to the first antenna 50 via the respective modulator 122, and the other sub-stream is routed to the second antenna 51 via the decorrelation and modulation part 120 and the selector switch 130. The selector switch 130 may typically be implemented in software, but any equivalent implementation of the same function may be used.

In operation, the ratio of demultiplexing and of diversity splitting is varied by dynamically switching between the first and second modes. In this way a variable ratio of spatial-multiplexing gain (in the first mode) and diversity gain (in the second mode) can be achieved.

Figure 18:
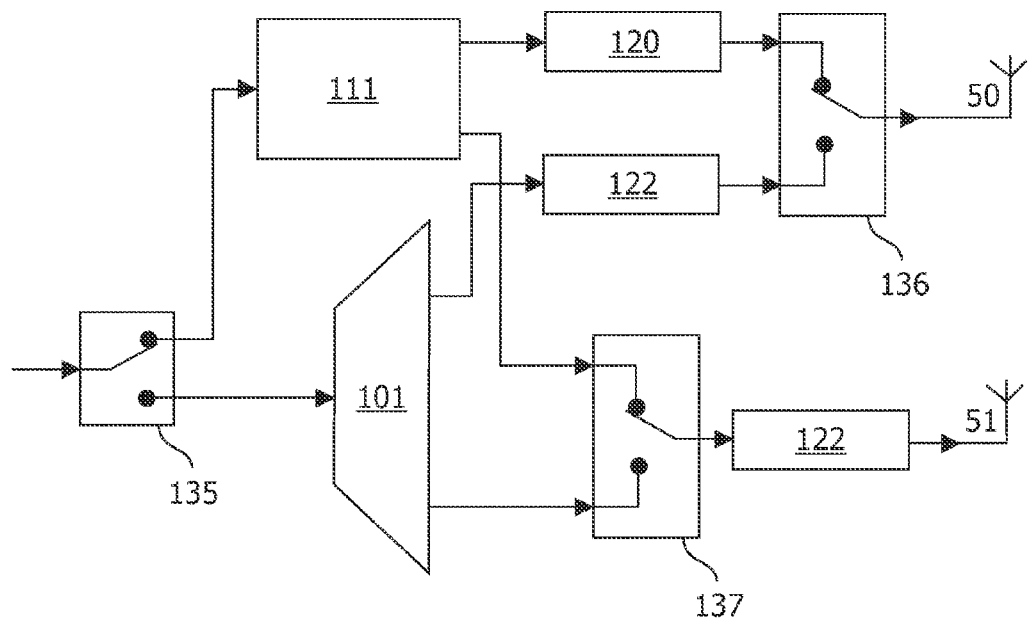

FIG. 18 shows another embodiment employing two antennas that can deliver transmitted signals identical to those transmitted by the embodiment of FIG. 17. The same reference numerals have been used for corresponding blocks in FIG. 17. A demultiplexer 101 does not need to be variable as it need only operate in one way, but it is advantageous if it can be enabled and disabled dynamically under the control of the demux and split ratio controller (not illustrated) in order to minimise power consumption. Three two-way switches 135, 136 and 137 are included. In the first mode, all of the two-way switches 135, 136, 137 are set to the positions illustrated, such that the antennas 50, 51 transmit sub-streams output by the splitter 111. In the second mode, all of the two-way switches 135, 136, 137 are set in the opposite positions, such that the antennas 50, 51 transmit demux streams delivered by the demultiplexer 101. As for the embodiment of FIG. 17, the ratio of demultiplexing and of diversity splitting is varied by dynamically switching between the first and second modes under the control of the demux and split ratio controller.

Alternatively, the selector switch 130 in FIG. 17, and the two-way switches 135, 136, 167 in FIG. 18, may be replaced by appropriate switches at alternative locations, particularly within the decorrelation and modulation part 120 or within the modulator 122, depending on the detailed functionality of these blocks.

Figure 19:
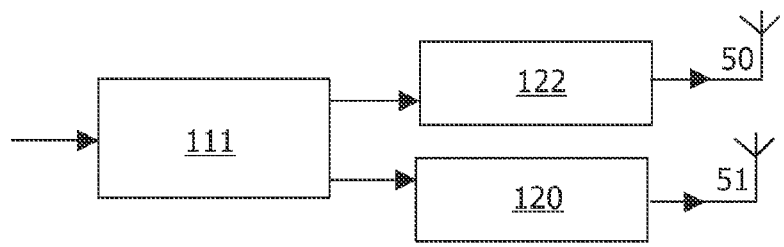

In FIG. 19 a further configuration is illustrated that uses two antennas. Two duplicate copies of an input data stream are generated by a splitter 111. One of the copies is routed to a first antenna 50 via a modulator 122, and the other copy is routed to a second antenna 51 via a decorrelation and modulation part 120. The decorrelation performed by the decorrelation and modulation part 120 may be implemented in any of a variety of ways, examples of which are described herein. The use of decorrelation enables the benefits of spatial multiplexing to be achieved by receiving the sub-streams as spatially multiplexed sub-streams, and simultaneously, because the sub-streams contain duplicate data, the benefits of diversity to be achieved by combining sub-streams at the receiver, after recorrelation. The transmitter of FIG. 19 can be generalised to any number of antennas by employing more sub-streams, one per antenna, and provides for all of the sub-streams to be decorrelated.

In the configurations illustrated in FIGS. 17 to 19 a single diversity sub-stream or demux stream is routed to a single antenna. Alternatively, if greater channel knowledge is available at the transmitter, and/or the transmitter employs beamforming or pre-coding mappings of sub-streams to antennas, the sub-streams or demux streams may be routed to more than one antenna with potentially different weightings, therefore providing directivity.

As described, the signals transmitted by the transmitter of FIG. 19, or the generalised version, have a plurality of duplicate sub-streams which have been decorrelated prior to transmission. A receiver for receiving such signals comprises a recorrelating arrangement for recorrelating the decorrelated sub-streams coupled to a combiner arranged to recombine the recorrelated sub-streams. Recorrelating arrangements and combiners are described herein.

The embodiments of the invention have been conceived in the context of the transmitter in cellular radio handsets targeted at the 2.5G and 3G standards. It is of potential application to any transmitter in which MIMO techniques are used. Such wireless communication systems can include systems using frequency division multiple access (FDMA), time division multiple access (TDMA), and various spread spectrum techniques, such as code division multiple access (CDMA) signal modulation. GSM systems use a combination of TDMA and FDMA modulation techniques. Wireless communication devices incorporating wireless technology can include cellular radiotelephones, PCMCIA cards incorporated within portable computers, personal digital assistants (PDAs) equipped with wireless communication capabilities, and the like.

In summary, the embodiments can provide a low complexity modification to existing spatial multiplexing schemes that permits them to exploit diversity gains instead of, or in addition to, spatial multiplexing. Further, the approach is able to flexibly adjust the balance between the two gains whilst retaining the transmit and receive processing essentially unchanged. In particular, the more complex processing parts such as coding/decoding need not be changed, hence the heavy cost and processing overhead in the receiver of implementing and switching between, for example, multiple space-time coders/decoders, can be avoided.

Embodiments of this invention could be applied in wireless systems using MIMO techniques including, but not restricted to, current and future evolutions of cellular systems such as UMTS and wireless LANs such as IEEE802.11.

It applies to systems with multiple transmit antennas, ordinarily this implies MIMO (i.e. there are also multiple receive antennas), but can also be applied to MISO if the MISO system provides means for receiving multiple streams, by, for example, applying the methods in US2003/0013468.

Although described examples show the splitter after the demultiplexer, in principle the order could be reversed. In this case, the receiver should be rearranged to correspond, so the order of remultiplexing and recombining in the receiver would also be reversed. Embodiments of the invention may be conveniently implemented using a conventional general purpose digital computer or microprocessor programmed according to the teachings of the present specification, as will be apparent to those skilled in computers. Appropriate software coding can readily be prepared by skilled programmers based on the teachings of the present disclosure, as will be apparent to those skilled in software.

Embodiments may also be implemented by the preparation of application specific integrated circuits or by interconnecting an appropriate network of conventional component circuits, as will be readily apparent to those skilled in the art.

Embodiments may also be implemented by a computer program product on a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art within the scope of the claims.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

The invention claimed is:

1. A transmitter for transmitting information using multiple spatial wireless channels, comprising:
   a demultiplexer arranged to provide a set of at least one data stream carrying a part of the information, and
   a diversity splitter arranged to provide a set of copies of the data stream,
   wherein
   the demultiplexer and the diversity splitter are controllable so that a switch can be made from using two spatial wireless channels for transmitting single copies of two respective data streams, to using the two spatial wireless channels for transmitting two copies of a same data stream.

2. The transmitter of claim 1, further comprising a decorrelator arranged to decorrelate the copies of a data stream, before or after modulation, for transmission over different ones of the spatial wireless channels.

3. The transmitter of claim 2, wherein the decorrelator comprises any one or more of:
   a scrambler arranged to scramble the copies of a data stream differently,
   an interleaver arranged to interleave the copies of a data stream differently, and
   a coder arranged to code the copies of a data stream differently.

4. The transmitter of claim 3, wherein the coder for coding the copies of a data stream, the decorrelator including the interleaver arranged to interleave the copies of a data stream differently to provide the decorrelation, the interleave differences not being dependent on coding differences.

5. The transmitter of claim 3, wherein the decorrelator comprises the scrambler arranged to scramble the copies of a data stream differently, the scrambler being arranged to operate on any one or more of:
   uncoded bits before a coder,
   encoded bits output by a coder, and
   symbols output by a modulator.

6. The transmitter of claim 1, wherein the diversity splitter and the decorrelator are arranged to provide uncorrelated copies of a data stream output from the demultiplexer.

7. The transmitter of claim 1, wherein a control of the diversity splitter and the demultiplexer are responsive to feedback indicating conditions of one or more of the spatial wireless channels.

8. The transmitter of claim 1, further comprising a baseband processor, the demultiplexer and the diversity splitter being part of the baseband processor.

9. A receiver for receiving signals transmitted over respective spatial wireless channels by a transmitter, the receiver comprising:
   a combiner arranged to multiplex two signals transmitted over two spatial wireless channels in case the transmitter uses these two spatial wireless channels for transmitting single copies of two respective data streams, and to combine the two signals transmitted over the two spatial wireless channels, in case the transmitter uses these two spatial wireless channels for transmitting two copies of a same data stream.

10. The receiver of claim 9, further comprising a recorrelating arrangement for recorrelating decorrelated copies of the same data stream before these are combined.

11. The receiver of claim 10, wherein the recorrelating arrangement comprises any one or more of:
   a descrambler,
   a de-interleaver, and
   a decoder.

12. A method of transmitting information over a wireless communication link using multiple spatial wireless channels, comprising:
   providing, by a demultiplexer, a set of at least one data stream carrying a part of the information,
   providing, by a diversity splitter, a set of copies of a data stream, and
   controlling the demultiplexer and the diversity splitter such that at least one of the following switches are made:
   a switch from using two spatial wireless channels for transmitting single copies of two respective data streams to using the two spatial wireless channels for transmitting two copies of a same data stream, and
   an inverse switch.

13. A method of receiving information over a wireless communication link using multiple spatial wireless channels, comprising:
   receiving signals transmitted over spatial wireless channels, and at least one of the following:
   multiplexing two signals transmitted over two spatial wireless channels in case the two spatial wireless channels are used for transmitting single copies of two respective data streams, and
   combining the two signals transmitted over the two spatial wireless channels in case the two spatial wireless channels are used for transmitting two copies of a same data stream.

14. A transmitter for transmitting information using multiple spatial wireless channels, comprising:
   a demultiplexer arranged to derive two or more demux streams carrying different parts of the information,
   a diversity splitter arranged to derive duplicate sub-streams from the information or from one or more of the sub-streams, for transmission over the channels,
   a decorrelator arranged to decorrelate the duplicate sub-streams, and
   a coder for coding the duplicate sub-streams,
   the decorrelator comprising an interleaver arranged to interleave the duplicate sub-streams differently to provide the decorrelation, the interleave differences not being dependent on coding differences.

* * * * *